United States Patent
Shrider

(10) Patent No.: US 10,708,389 B2
(45) Date of Patent: Jul. 7, 2020

(54) PHASED DEPLOYMENT OF SCALABLE REAL TIME WEB APPLICATIONS FOR MATERIAL HANDLING SYSTEM

(71) Applicant: Intelligrated Headquarters, LLC, Mason, OH (US)

(72) Inventor: James A. Shrider, Liberty Township, OH (US)

(73) Assignee: INTELLIGRATED HEADQUARTERS, LLC, Mason, OH (US)

(*) Notice: Subject to any disclaimer, the term of this patent is extended or adjusted under 35 U.S.C. 154(b) by 180 days.

(21) Appl. No.: 15/369,981

(22) Filed: Dec. 6, 2016

(65) Prior Publication Data

US 2018/0159959 A1 Jun. 7, 2018

(51) Int. Cl.
*H04L 29/08* (2006.01)
*G05B 19/05* (2006.01)
(Continued)

(52) U.S. Cl.
CPC ............ *H04L 67/36* (2013.01); *G05B 19/042* (2013.01); *G05B 19/05* (2013.01); *G06F 3/0484* (2013.01);
(Continued)

(58) Field of Classification Search
CPC .... G05B 19/042; G05B 19/05; G05B 19/408; G05B 19/418; G05B 19/41845;
(Continued)

(56) References Cited

U.S. PATENT DOCUMENTS 5,859,847 A * 1/1999 Dew ................. G05B 19/0421
370/389
6,792,605 B1 * 9/2004 Roberts ............... H04L 67/2823
709/202

(Continued)

OTHER PUBLICATIONS

Wikipedia contributors, 'Open Platform Communications', Wikipedia, The Free Encyclopedia, Sep. 23, 2019, 05:17 UTC, <https://en.wikipedia.org/w/index.php?title=Open_Platform_Communications&oldid=917296606> [accessed Sep. 25, 2019] (Year: 2019).*

(Continued)

*Primary Examiner* — Vivek Srivastava
*Assistant Examiner* — William C McBeth
(74) *Attorney, Agent, or Firm* — Alston & Bird LLP

(57) ABSTRACT

A system and method provides data reporting and real-time user interfaces to a client device of a material handling system according to a unified architecture. The method includes (i) receiving, by a machine automation controller, real-time data of one or more machine automation devices of a material handling system; (ii) controlling, by the machine automation controller, the one or more machine automation devices using the real-time data as feedback; (iii) shaping the real-time data according to a domain model into a staging object; (iv) maintaining a cache object that corresponds to the staging object in a broker process; and (v) responding to one or more client requests for a data item by transmitting at least a portion of data contained in the cache object to a client device for presenting in a user interface. The client device may also be collecting historical data or statistical data for reporting purposes.

20 Claims, 6 Drawing Sheets

(51) Int. Cl.
*G05B 19/042* (2006.01)
*G06F 3/0484* (2013.01)
*G06F 9/451* (2018.01)
*G06Q 50/28* (2012.01)
*G06Q 10/08* (2012.01)

(52) U.S. Cl.
CPC ........... *G06F 9/451* (2018.02); *G06Q 10/083* (2013.01); *G06Q 50/28* (2013.01); *G05B 2219/15052* (2013.01)

(58) Field of Classification Search
CPC .... G06F 9/454; G06Q 10/083; G06Q 10/087; G06Q 50/28; H04L 67/10; H04L 67/28; H04L 67/2809; H04L 67/2823; H04L 67/2842; H04L 67/36; H04L 67/12; H04L 67/125
See application file for complete search history.

(56) References Cited

U.S. PATENT DOCUMENTS

| | | | | |
|---|---|---|---|---|
| 7,650,405 | B2* | 1/2010 | Hood | G05B 19/4185 709/217 |
| 8,156,232 | B2* | 4/2012 | Callaghan | G05B 19/05 700/83 |
| 9,684,733 | B2* | 6/2017 | Niddapu | G06F 17/30905 |
| 2003/0084201 | A1* | 5/2003 | Edwards | G05B 19/0426 719/328 |
| 2004/0021679 | A1* | 2/2004 | Chapman | G05B 19/042 715/700 |
| 2005/0071801 | A1* | 3/2005 | Jesse | G06F 8/34 717/100 |
| 2005/0097526 | A1* | 5/2005 | Hauduc | G06F 9/454 717/136 |
| 2006/0095855 | A1* | 5/2006 | Britt | G05B 19/042 715/760 |
| 2008/0221867 | A1* | 9/2008 | Schreiber | G06F 9/454 704/8 |
| 2011/0161402 | A1* | 6/2011 | Anderson | H04L 67/125 709/203 |
| 2013/0211559 | A1* | 8/2013 | Lawson | H04L 67/2804 700/83 |
| 2014/0090017 | A1* | 3/2014 | Birzer | G06F 21/56 726/3 |
| 2014/0122055 | A1* | 5/2014 | Hobson | G06F 9/454 704/8 |
| 2014/0291112 | A1* | 10/2014 | Lyon | B65G 1/1378 198/341.01 |
| 2015/0189005 | A1* | 7/2015 | Dubois | H04L 67/2823 709/217 |
| 2016/0285708 | A1* | 9/2016 | Papadopoulos | H04L 67/125 |
| 2016/0325315 | A1 | 11/2016 | Zimmer et al. | |
| 2017/0001653 | A1* | 1/2017 | Ferencz, Jr. | H04L 67/12 |
| 2017/0006135 | A1* | 1/2017 | Siebel | H04L 67/10 |
| 2017/0048079 | A1* | 2/2017 | Nethi | H04L 67/2823 |
| 2017/0070563 | A1* | 3/2017 | Sundermeyer | H04L 12/2809 |
| 2017/0102678 | A1* | 4/2017 | Nixon | G05B 19/4185 |
| 2017/0220012 | A1* | 8/2017 | Hart | H04L 67/12 |
| 2017/0220334 | A1* | 8/2017 | Hart | H04L 67/34 |
| 2018/0024537 | A1* | 1/2018 | Chauvet | G06F 9/45558 718/104 |

OTHER PUBLICATIONS

H. Mannaert, P. Huysmans and P. Adriaenssens, "Connecting Industrial Controllers to the Internet through Software Composition in Web Application Servers," Second International Conference on Internet and Web Applications and Services (ICIW'07), Morne, 2007, pp. 42-42. (Year: 2007).*
Dominic Duggan, "Domain-Driven Architecture," in Enterprise Software Architecture and Design: Entities, Services, and Resources, , IEEE, 2012, pp. 167-206 (Year: 2012).*
Coulouris, G., et al., "Distributed Systems: Concepts and Design," May 7, 2011, 5th edition, Addison-Wesley.
Guinard, D., et al., "Building the Web of Things: With examples in Node.js and Raspberry Pi," Jun. 18, 2016, Manning Publications.
Reidel, T., et al., "Using web service gateways and code generation for sustainable IoT system development," 2010, IEEE.
Tanenbaum, A.S., et al., "Distributed Systems: Principles and Paradigms," Oct. 12, 2008, 2nd Edition, Prentice Hall.
Vermesan, O., et al., "Internet of Things: Converging Technologies for Smart Environments and Integrated Ecosystems," Jun. 5, 2013, River Publishers.
Wikipedia, "Translation Memory eXchange," Oct. 21, 2016, https://en.wikipedia.org/w/index.php?title+Translation_Memory_eXchange&oldid=745552748.
Wikipedia, "Version control," Dec. 1, 2016, https://en.wikipedia.org/w/index.php?title=Version_control&oldid=752478072.
Extended European Search Report for European Patent Application No. 17205399.3 dated Mar. 13, 2018.
"Domain-driven design", Nov. 26, 2016, Wikipedia, https://en.wikipedia.org/w/index.php?title=Domain-driven_design&oldid=751622274.
"Marshalling (computer science)", Dec. 4, 2016, Wikipedia, https://en.wikipedia.org/w/index.php?title=Marshalling_(computer_science)&oldid=752971037.
"Model-driven engineering", Dec. 4, 2016, Wikipedia, https://en.wikipedia.org/w/index.php?title=Model-driven_engineering&oldid=753013067.
Colombo, Armando W. et al., Industrial Cloud-Based Cyber-Physical Systems: The IMC-AESOP Approach, Springer, Preface, ToC, Ch01-Ch06, Ch11, (2014).
European Application No. 17205399.3, Office Action dated Jul. 26, 2019, 11 pages.
Fortino, Giancarlo et al., Internet of Things Based on Smart Objects: Technology, Middleware and Applications, Springer, ToC, Ch01-Ch04, Ch09, Ch10, (2014).
Mahnke, Wolfgang et al., OPC Unified Architecture, Springer, XP055160132, ToC-339, (2009).
Millett, Scott et al., Patterns, Principles, and Practices of Domain-Driven Design, Wrox, ToC, Ch04-Ch05, Ch22-Ch24, Ind, (2015).
Seroter, Richard et al., "SOA Patterns with BizTalk Server 2013 and Microsoft Azur," 2nd ed., Packt Publishing, ToC, Ch01-Ch06, Ch08-Ch14, Ind, (2015).
Studer, Rudi et al., Semantic Web Services: Concepts, Technologies, and Applications, 2007 ed., Springer, ToC, Ch01-Ch02, Ch05, (2007).
Tarkoma, Sasu, Publish/Subscribe Systems: Design and Principles, Wiley, 1st Ed., ToC, Ch01-Ch02, Ch04, Ch06-Ch07, Ch12, Ch14, Ind., (2012).
Annex to Summons to Attend Oral Proceedings for European Application No. 17205399.3, dated Mar. 23, 2020, 6 pages.
Summons to Attend Oral Proceedings for European Application No. 17205399.3, dated Mar. 23, 2020, 2 pages.
Annex to the communication dated May 6, 2020 for EP Application No. 17205399.

* cited by examiner

PHASED DEPLOYMENT OF SCALABLE REAL TIME WEB APPLICATIONS FOR MATERIAL HANDLING SYSTEM

BACKGROUND

1. Technical Field

The present disclosure relates to a readily scalable and upgradeable user interface that can support both object oriented programming (OOP) clients and Representational state transfer (REST) clients, and is particularly related to a user interface for machine automation controls of a material handling system.

2. Description of the Related Art

A distribution center for a set of products is a warehouse or other specialized building, often with refrigeration or air conditioning, which is stocked with products (goods) to be redistributed to retailers, to wholesalers, or directly to consumers. A distribution center is a principal part, the order processing element, of the entire order fulfillment process. Distribution centers are usually thought of as being demand driven. A distribution center can also be called a warehouse, a DC, a fulfillment center, a cross-dock facility, a bulk break center, and a package handling center. The name by which the distribution center is known is commonly based on the purpose of the operation. For example, a "retail distribution center" normally distributes goods to retail stores, an "order fulfillment center" commonly distributes goods directly to consumers, and a cross-dock facility stores little or no product but distributes goods to other destinations.

Distribution centers are the foundation of a supply network, as they allow a single location to stock a vast number of products. Some organizations operate both retail distribution and direct-to-consumer out of a single facility, sharing space, equipment, labor resources, and inventory as applicable. A typical retail distribution network operates with centers set up throughout a commercial market, with each center serving a number of stores. Large distribution centers for large retail companies can serve 50-125 stores. Suppliers ship truckloads of products to the distribution center, which stores the product until needed by the retail location and ships the proper quantity.

Since a large retailer might sell tens of thousands of products from thousands of vendors, it would be impossibly inefficient to ship each product directly from each vendor to each store. Many retailers own and run their own distribution networks, while smaller retailers may outsource this function to dedicated logistics firms that coordinate the distribution of products for a number of companies. A distribution center can be co-located at a logistics center. A large distribution center might receive and ship more than ten thousand truckloads each year, with an individual store receiving from only a couple trucks per week up to 20, 30, or more per week. Distribution centers range in size from less than 50,000 square feet (5,000 m$^2$) to the largest approaching 3 million square feet (3,000,000 m).

A material handling system for the distribution center can include automation machine controls for many types of subsystems such as transport conveyors, palletizers, sorters, order fulfillment stations, etc. The layout and types of such subsystems is generally customized for specific business processes of a particular manufacturing, retail, e-commerce, or wholesale customer. Even for the same customer, a particular distribution center is generally uniquely designed based on needs that arise over time or that are geographically driven. As such, a human machine interface (HMI) for parts or the entirety of the material handling system are also generally specific to the particular material handling system at the specific distribution center. Often, intimate knowledge of the hardware automation is required to provide for direct reading of data necessary to control or report on activity of the material handling system. The controller that is performing real-time control of the machine automation also has to provide direct reading of real-time data. Creation of each version of a unique HMI can be a time consuming and expensive proposition, which is further complicated by introductions of new user platforms such as tablets, smartphones, etc.

With proliferation of high-performance mobile devices such as tablets and smartphones, increasingly operators of material handling systems seek to increase the number of users that can interact with an HMI. Some users such as installers and commissioning/upgrade engineers, have a need to interact with intimate real-time details of the design and operation, such as through a socket-based implementation of an object oriented program. Other users may require business intelligence or status reporting via web-based interface. Supporting diverse interface requirements with increasing number of users can impose additional problems in scaling the capacity of the HMI. The machine automation controller can be overwhelmed with the additional overhead of responding to numerous requests for information on real-time parameters and performance data.

SUMMARY

The illustrative embodiments of the present disclosure presents a method of providing data reporting and real-time data to user interfaces of client devices of a material handling system. In one or more embodiments, the method includes receiving, by a machine automation controller, real-time data of one or more machine automation devices of a material handling system. The method includes controlling, by the machine automation controller, the one or more machine automation devices using the real-time data as feedback. The method includes shaping the real-time data according to a domain model into a staging object. The method includes maintaining a cache object that corresponds to the staging object in a broker process. Method includes responding to one or more client requests for a data item by transmitting at least a portion of data contained in the cache object to a client device for presenting in a user interface or collecting for reporting purposes.

According to another aspect of the present disclosure, a material handling system includes a network in communication with one or more machine automation devices. A machine automation controller is in communication with the one or more automation devices over the network. The machine automation controller (i) receives real-time data of the one or more machine automation devices, (ii) controls the one or more machine automation devices using the real-time data as feedback, and (iii) shapes the real-time data according to a domain model into a staging object. The material handling system includes a gateway system that is in communication over the network to the machine automation controller. The gateway system includes a processor subsystem that executes a broker process to: (i) maintain a cache object that corresponds to the staging object, and (ii) respond to one or more client requests for a data item by transmitting at least a portion of data contained in the cache object to a client device for presenting in a user interface or collecting for reporting purposes.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

DETAILED DESCRIPTION

Figure 1:
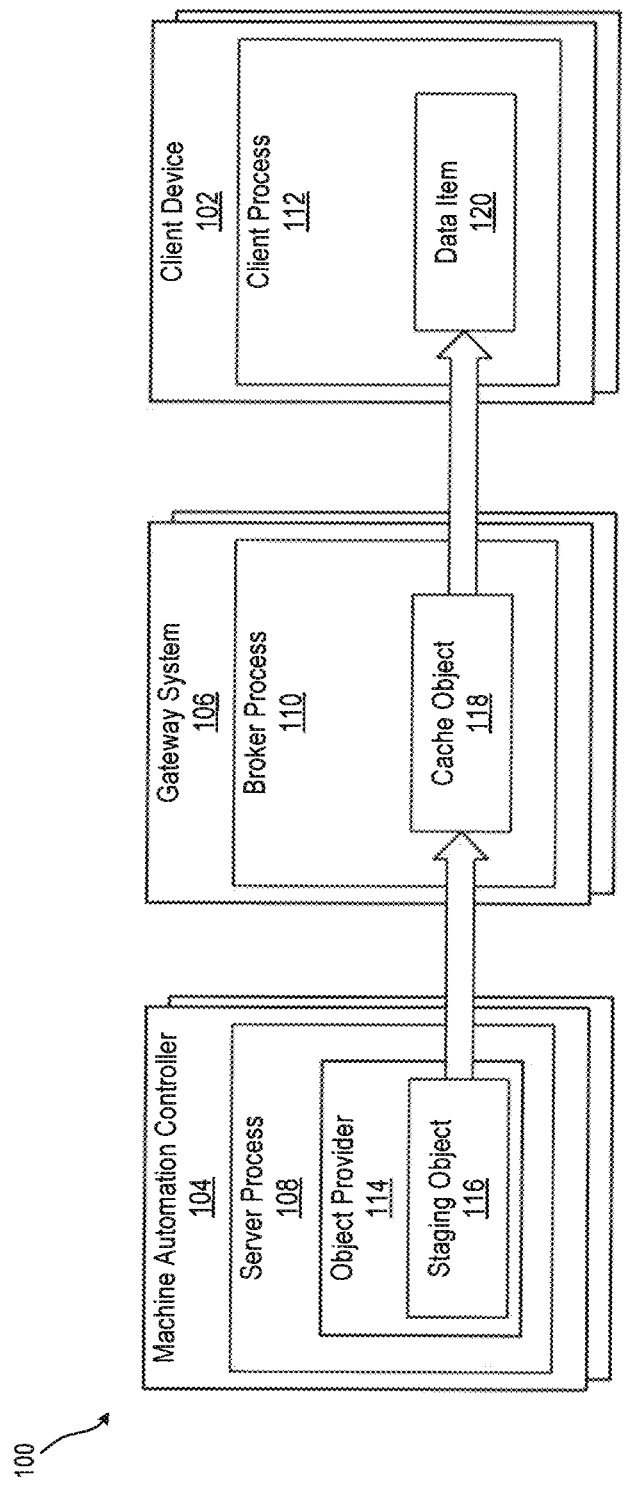
FIG. 1 illustrates a simplified block diagram of a unified architecture (UA) for scalable, industrial internet of things (IIoT) friendly data dissemination as well as supporting real-time control of a material handling system, according to one or more embodiments.

The present disclosure provides a material handling system that incorporates a unified architecture for facilitating rapid development and deployment of human-machine interface (HMI) capabilities. Unified Architecture efficiently communicates across networks while providing real time data display and minimizing software update size. Unified Architecture is a cornerstone to building the Unified UI where client code is essentially common regardless of the machine control technology that populates the data. Unified UI standardizes operation and display of machinery and processes. Unified Architecture moves versioned objects between clients and servers using an optimized binary protocol. The technology is server driven so clients always construct objects that exactly match server objects. Clients may include the user interface, data collection, or other machines. Unified Architecture provides scalable, distributed object technology (DOT).

According to one aspect of the present disclosure, the material handling system has an adapter that shapes data coming from machine automation controllers into a standard form that is described by a domain model. Domain Model is a description in eXtensible Markup Language (XML) form of places and things in the customer's environment that is used to create a software contract to solve problems related to that domain. Both at build time and at run time, the domain model generates code skeletons using XML. The domain model is an Application Programming Interface (API) or adapter that includes a set of routines, protocols and tools for building software applications. In Domain Model usage, the API is the software contract between the client and server. Developers work with the code skeletons from the domain model to create implementations. For updating server or client while maintaining binary compatibility, in one or more embodiments a JavaScript augmentation provides referencing and binding to augment class that can change according to standard API rules.

Class is a template definition of the methods and variables in a particular kind of object. An object is a specific instance of a class; it contains real values instead of variables. Object Model is an API document for object-oriented programming. Object-Oriented Programming (OOP) is a programming model organized around objects that contain data (i.e., fields) and the operations (i.e., methods) associated with them. Key concepts of OOP include encapsulation, composition, inheritance, and polymorphism, all of which are supported by the Domain Model.

Thereby, complex, unique and evolving material handling systems with a large number of disparate controllers and versions of machine automation code can be handled by an HMI with little to no sensitivity to changes in versions and types of machine automation. Unlike past customized project-based material handling systems, the present innovation provides for a productized approach to obtaining data from the machine automation.

According to another aspect of the present disclosure, a material handling system provides for scaling a number of HMI users and types of HMI users without creating an overhead burden on the automation controllers. Typical socket-based machine automation controllers that implement object oriented programming or programmable logic can be overwhelmed by too many requests for data from HMI users. Such web socket-based machine automation controllers cannot apply the approach used by representational state transfer (REST) or RESTful web services to add additional web servers to scale to demand. The present innovation provides for scalability of web socket-based machine automation controllers by introducing distributed object technology (DOT). A DOT gateway utilizes the domain model to obtain a complete cached shadow copy of the real-time data of the machine automation controller/s. The DOT gateway supports both object-oriented clients and RESTful web services. Additional DOT gateways can be added for additional scalability. As an object-oriented API, the HMI provided by the DOT gateway utilizes a binary protocol that is very efficient and real-time event driven. As also serving as a RESTful API, the DOT gateway supports the IIoT.

DOT gateway is an Industrial Internet of Things (IIoT) friendly approach, isolating legacy systems from outside access to provide system protection in addition to providing greater data accessibility. IIoT is made up of a multitude of devices connected by communications software. The resulting systems, and even the individual devices that comprise it, can monitor, collect, exchange, analyze, and instantly act on information to intelligently change their behavior or their environment—all without human intervention.

With regard to web socket based control, creators of machine controls for automation of a material handling system often employ object-oriented programming (OOP). OOP is a programming paradigm based on the concept of "objects", which may contain data, in the form of fields, often known as attributes; and code, in the form of procedures, often known as methods. A feature of objects is that an object's procedures can access and often modify the data fields of the object with which they are associated (objects have a notion of "this" or "self"). In OOP, computer programs are designed by making them out of objects that interact with one another. There is significant diversity of OOP languages, but the most popular ones are class-based, meaning that objects are instances of classes, which typically also determine their type. During installation, commissioning, upgrading and maintenance, developers often have need of accessing a user interface of the material handling system via an object-oriented client.

Other users, such as analysts with a need for operational reporting, prefer to access a user interface to the material handling system that uses a browser-style client. In particular, a representational state transfer (REST) or RESTful web services are one way of providing interoperability between computer systems on the Internet to provide such information. REST-compliant web services allow requesting systems to access and manipulate textual representations of web resources using a uniform and predefined set of stateless operations. "Web resources" were first defined on the World Wide Web as documents or files identified by their URLs, but today they have a much more generic and abstract definition encompassing everything or entity that can be identified, named, addressed or handled, in any way whatsoever, on the web. By making use of a stateless protocol and standard operations REST systems aim for fast performance, reliability, and the ability to grow, by using reused components that can be managed and updated without affecting the system as a whole, even while the system is running.

According to another aspect of the present disclosure, language localization permeates the HMI of the material handling system. Domain model supports packaging of invariant text with an optional number of other languages bundled together in the same string in UTF8 format, including special characters. The DOT gateway can strip off languages that are not asked for by a client. In an instance where a language that is requested is not supported, the DOT gateway can determine the closest language. For example, the requested language can be British English but the system is able to provide American English. This localizable string approach allows for switching languages without reloading a page. In addition to being more efficient, this ability can allow activities such as debugging a system between multiple languages without having to restart the system. Such a restart could cause an elusive software bug to temporarily go away before the bug is identified. DOT gateway provides a configurable data store (CDS) that is an abstracted pseudo database. CDS is a hierarchical data store provided by the host machine control server. CDS is analogous to the Windows Registry, but it is versioned and secured. DOT gateway handles sorting and filtering. Clients can sort and search within a particular language without affecting other clients.

According to a further aspect of the present disclosure, a common user experience is presented for presenting data for each of the machine automation controllers. Thus, installers or commissioning engineers for a particular material handling subsystem such as a linear sorter can more readily adapt to performing a similar function for another material handling subsystem such as a loop sorter. As a particular example, a diagnostic design pattern has the same appearance.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations FIG. 1 illustrates a unified architecture 100 for scalable, IIoT friendly data dissemination as well as supporting real-time control. Unified architecture (UA) 100 supports internal communications technology based on web sockets and binary data transfer between client device 102 and machine automation controller or server 104. The technology is server driven, meaning that the server expresses capabilities that determine client presentation to users. A domain model (not shown) keeps the protocol consistent between clients and servers. UA 100 also features solutions for server side searching sorting and paging of large data sets. UA 100 provides a unified UI with consistent presentation of subsystems and tracked objects based on the Domain Model.

UA 100 includes a gateway system 106 takes over the bulk of the UI responsibilities from the machine automation controller 104. For clarity, the machine automation controller 104 performs a server process 108. The gateway system 106 performs a broker process 110. The client device 102 performs a client process 112. The broker process 110, and client process 112 are machine-agnostic. Part of the server framework is also machine agnostic, but the object providers of the server process 108 are not machine agnostic. The processes 108, 110, 112 may run on the same controller hardware or they may be spread across multiple machines. A single site may have any number of server, broker, and client processes 108, 110, 112. In one or more embodiments, a configuration runs the server and broker processes 108, 110 on the controller 104, and the client processes 112 on workstation and/or tablet devices. Larger installations with many clients can run the server and broker processes 108, 110 on separate machines to minimize the controller workload, such as including the separate gateway system 106.

The server process 108 utilizes an object provider 114 to create and maintain a staging object 116. The staging object 116 transfers information from shared memory or from real world devices to a domain model object. In other words, staging object 116 shapes or "stages" the data for presentation to the clients. The structure and behavior of a staging object 116 is defined by a domain model class. If the domain model defines methods for a class, the staging object 116 implements these methods.

The object provider 114 creates staging objects 116 and populate the staging objects 116 with data. Each real world subsystem typically has at least one object provider 114. An object provider 114 can manage as little as one staging object 116, but typically manages one or more lists that collect all of the currently available staging object instances in a subsystem. For example, a sorter root object provider allows users to access available logical and/or physical sorters. A single server process 108 can host multiple object providers 114. An adapter is simply an object provider 114 that obtains its data from a programmable logic controller (PLC) or legacy controller. An Adapter populates staging objects 116 just like any other object provider 114. The difference between an adapter and other types of object providers is that an adapter provides additional flexibility by providing a configurable mapping layer between the machine control and the domain model. Other object providers do not provide that configurability. A tool named UCAT (Unified Controller Adapter Tool) is a vehicle for building configuration for PLCs from different vendors as well as configuring legacy machine controls. One such example is configurations for different versions of legacy BOSS machine controls, provided by INTELLIGRATED, Mason, Ohio.

The broker process 110 manages a cache object 118 that is an intermediary between a staging object 116 and a data item 120 managed by the client process 112. A cache object 118 prevents multiple data updates from being a direct burden on a server, such as the machine automation controller 104. An object broker process 110 manages a set of cache objects 118 that correspond to the staging objects 116 for one object provider 114. Additionally, each object broker process 110 uses the Domain Model to automatically generate a REST API that provides client access to its cache objects.

Data item 120 resides in a UI client process 112. A data item 120 provides information from the domain model that can then be directly displayed or prepared for a user interface (not shown). Each data item 120 corresponds to one staging object 116 in a machine automation controller 116 such as a server. Multiple client processes 102 can simultaneously have data items 120 that correspond to the same staging object 116. For example, two UI client processes 102 could be viewing the same input/output (I/O) point.

Figure 2:
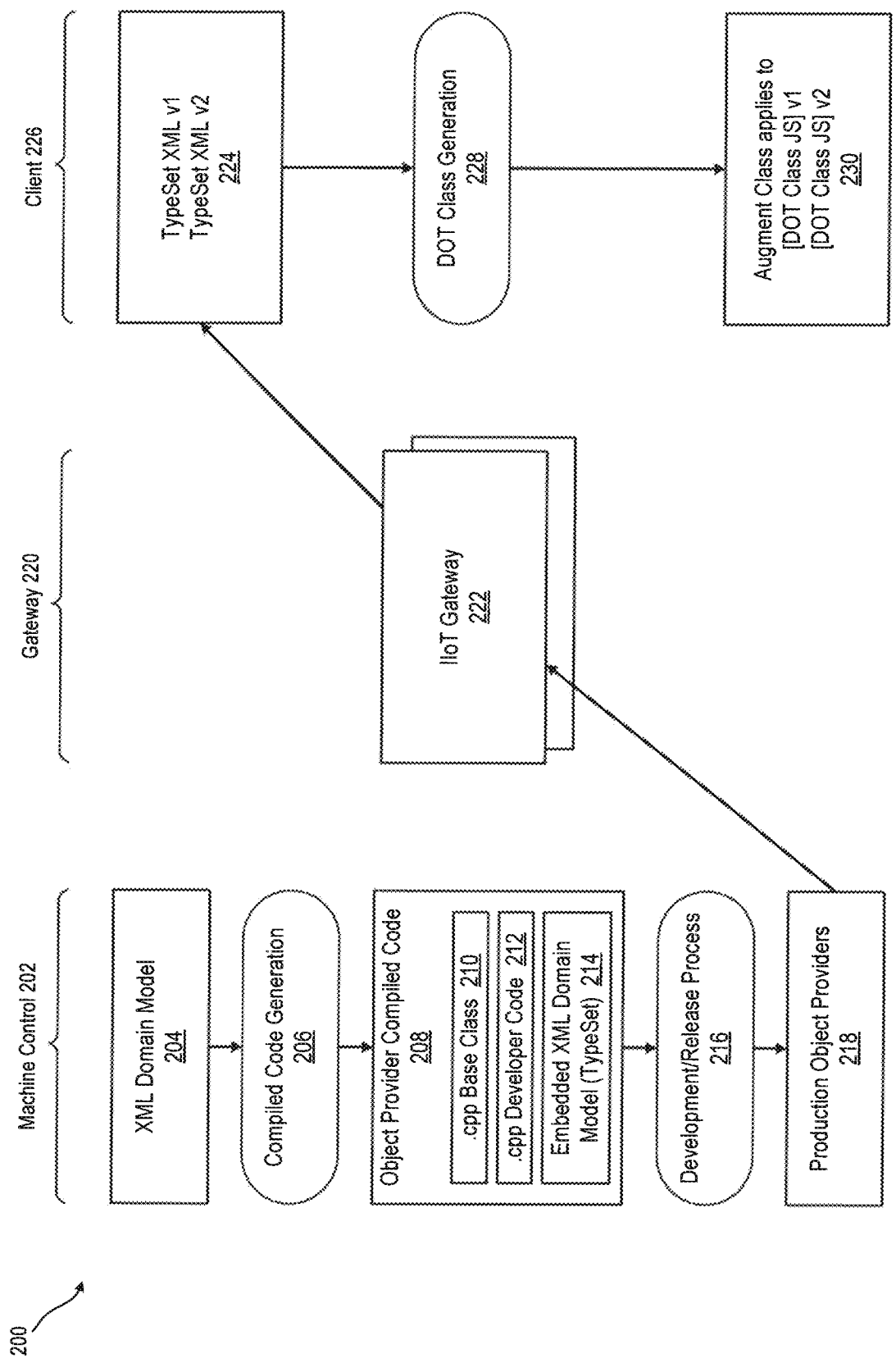
FIG. 2 illustrates a data flow diagram for an example UI, according to one or more embodiments.

In an exemplary embodiment, FIG. 2 illustrates a UI 200 implemented using C++(.cpp) language. A machine control 202 implements an XML domain model 204 from which a compiled code generation procedure 206 is performed to produce object provider compiled code 208. In particular, a .cpp base class 210, a .cpp developer code 212, and embedded XML domain model (TypeSet) 214 are generated. A development/release process 216 is performed using the UI compiled code 208 to produce production object providers 218. A gateway 220 includes one or more IIoT gateways 222 that access the production object providers 218 and produce TypeSet XML versions 224 to a client 226. The client 226 performs a DOT class generation process 228 to produce a versioned DOT JavaScript (JS) class 230. A version-agnostic JavaScript augment class is then merged onto the version-specific class.

Example requirements for XML domain model design are listed in TABLE 1:

TABLE 1

| Requirement | Description | Driven By |
| --- | --- | --- |
| Unify Access and Organize Complex Data | Access data from subsystems to individual data items. Supports base data types and embedding (reuse) of other XML elements. | OOP classes and REST resources |
| Versioning | Classes, APIs, and schemas must be versioned. REST data entry points must be versioned. | Tracking features and bugs to versions. Allows clients to run against older servers. |
| Extensibility | Adding new classes and URIs must be allowed by more than just product teams. | Supporting Product and Project teams |

TABLE 1-continued

| Requirement | Description | Driven By |
| --- | --- | --- |
| Selectively Open or Encapsulated Data Access | Data records require open access to support REST clients, but subsystems need to mediate access to encourage deterministic behavior. | Differences in data manipulation paradigms in REST vs. object-oriented architectures |
| Identify Real time Data | Identify data that needs to update in real time so that bandwidth is conserved. | Minimizing Wi-Fi and Cellular throughput requirements. Conserve mobile device batteries. |
| Freshness Date/ Time | All classes defined at the lowest (root) level must provide a last valid date. This is used unless overridden by higher-level children. | Clients can test against this and/or provide it in reports or UIs |
| No legacy code required | A code library may be supplied, but is not required, The API should be adequate for creating compatible implementations. | Allowing external customers to avoid library updates |
| XML and JSON Examples | REST API documentation must include examples in both XML and JSON form. REST should use content-type and accept-type HTTP headers to determine content type(s). | REST |
| Support Object Oriented and Resource Based Clients | In order to generate DOT, REST, and OPC UA APIs, the Domain Model must be sufficiently expressive to generate these forms as required. | Unifying access to mission critical data regardless of mechanism |

In one or more embodiments, clients can run against older or newer servers. With newer servers, all the new functionality will not necessarily be expressed, but at least the old client functionality can still work. New functionality can be expressed directly into the client UI via added properties.

The Domain Model takes an object-oriented approach to modeling the domain. An object is a structure that contains data, in the form of fields, and code, in the form of methods. An object typically corresponds to an item in the real world that is being modeled. For example, a digital input point could be represented by an object. It could have a Name field and a State field. It could also have a Force method that would be used to force the State to a particular value and an Unforce method to remove the force.

Using the Domain Model: The Domain Model is a set of XML documents that are generated into one or more of the following basic forms:

(i) API Code. A tool called DOTClassGen.exe generates C++ classes for direct implementation by object provider developers. DOTClassGen also embeds the DomaiUCATn Model XML in the object provider code. The UI runtime code later reads the Domain Model XML from the object provider (via the DOT gateway) and generates JavaScript classes that allows direct display bindings. This technology is part of the UI framework group's Unified Architecture initiative, also known internally as Distributed Object Technology (DOT). In one or more embodiments, the API code also includes data marshalling. Data marshalling avoids a requirement for screen developers to convert data to and from the protocol necessary to send it via the web socket across a wired or wireless network. This ability is all part of the generated code.

(ii) API Documentation. A tool called RESTDocGen.exe generates documentation from the Domain Model. External customers consume the documents as an alternative to consuming code. The document may be a REST API, which is a compatibility contract for a particular API version. The Domain Model contains descriptions of all the basic API elements, but additional formatting and specific examples may be needed to complete the document.

Domain Models: Fully featured subsystems are created from a domain model. Capabilities determine which features pertain to a particular sorter at a particular site. Security determines the subset of available features that pertain to a particular user group. A cross functional team creates the class models. Best practices are employed for building class models and interfaces and other members are added as needed to define a particular subsystem.

Unified Architecture supports data exchange between multiple machine control types and clients using a common API called a domain model. The Unified Controller Adapter Tool (UCAT) creates and edits cross reference XML files that configure available controller data to the domain model generated API. The domain model is a software contract between controller and clients.

A Domain Model is a representation of meaningful real-world concepts pertinent to a domain that needs to be modeled in software. The model uses XML documents to depict data and behavior that is either tracked or controlled by automation. The following constraint can be in place for a viable Domain Model: Committed and Reviewed API. Once an API is committed, rules must be carefully followed to protect clients from changes. These rules are vitally important for protecting data and methods that can't be removed or changed without breaking clients. The rules are simple and spelled out in Protecting Clients later in this section.

The following new technologies and capabilities require a robust and expressive Domain Model:

(i) Standardized Data Collection for Machine Control. Standardized access regardless of machine type saves cost by allowing one implementation of data collection rather than for each machine control type.

(ii) Unified UI. A standard Domain Model allows the same consistent UI design to be applied to many machine control technologies. The investment in design of the UI is made once and reused multiple times. One UI also saves money on translation, documentation, training and marketing. At the same time, customers get more choices with the material handling system manufacturer providing whatever suits the customer price point and existing expertise.

(iii) Unified Architecture. The Domain Model standardizes the client and server API. Unified Architecture supports demanding customer environments with potentially hundreds of clients and a wide range of machine controls. This supports our key accounts that have large scale operations. Unified Architecture also supports display and manipulation of large data sets. Simple searches of large event datasets help customers and the manufacturer support locate and understand problems more quickly and thereby minimize downtime.

(iv) Software Upgrades and Subscriptions. A customer can buy new UI features such as alarms and events or mobile UI support and experience the same state of the art experience. These upgrades can be sold by subscription with minimal impact for software upgrades.

(v) Improved customer responsiveness. If an operating system or browser upgrade breaks the client's system, the manufacturer can respond quickly with minimal software change. With a standardized API the client can be updated and deployed separately. No update of the machine control code is required. Customers have greater satisfaction and greater uptime.

Stopwatches are an optimization whereby the gateway and client interpolate values for a free running stopwatch. As long as a stopwatch does not transition from stopped to started or vice versa, no value is sent across the wire. The LastValid DateTime in the root object is used as a time source when computing interpolated Stopwatch values.

Figure 3:
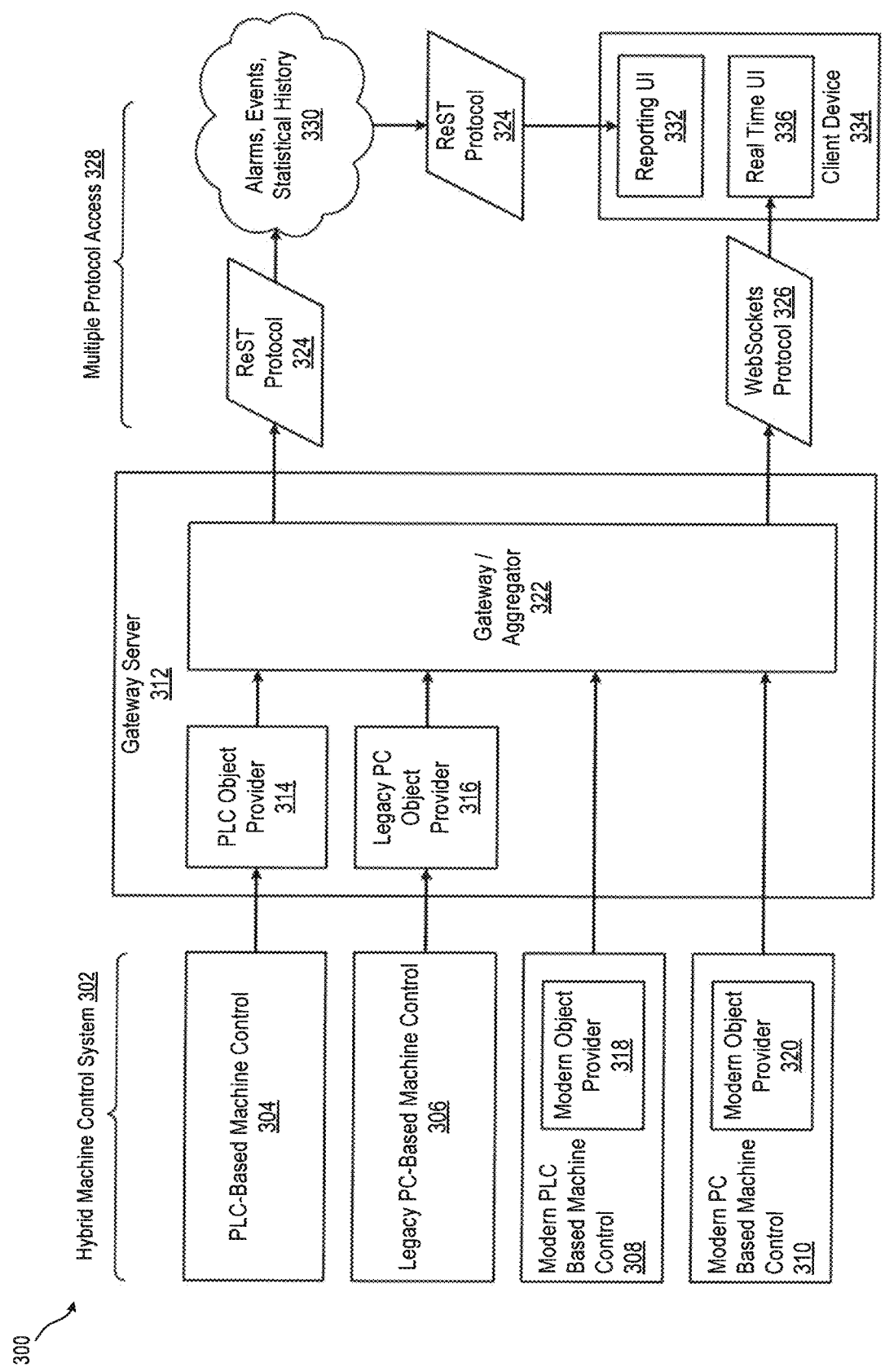
FIG. 3 illustrates a block diagram of a material handling system including a hybrid machine control system and a gateway server providing multiple protocol access, according to one or more embodiments.

FIG. 3 illustrates a material handling system 300 having a hybrid machine control system 302 comprised of PLC-based machine control 304, legacy personal computer (PC) based machine control 306, a modern PLC-based machine control 308, and a modern PC based machine control 310. To support respectively the PLC-based and legacy PC-based machine controls 304, 306, a gateway server 312 includes a PLC object provider 314 and a legacy PC object provider 316. Modem PLC and PC based machine controls 308, 310 include respectively their own modern object provider 318, 320. Each of the providers 314, 316, 318, 320 provide cache data to a gateway aggregator 322 that supports REST protocol 324 and Web Sockets protocol 326 for a multiple protocol access system 328. For example, a cloud-based monitoring system 330 can maintain alarms, events and statistical history that is received and relayed using REST protocol 324 to a reporting UI 332 of a client device 334. Web sockets protocol 326 can deliver real-time data to a real-time UI 336 of the client device 334.

Figure 4:
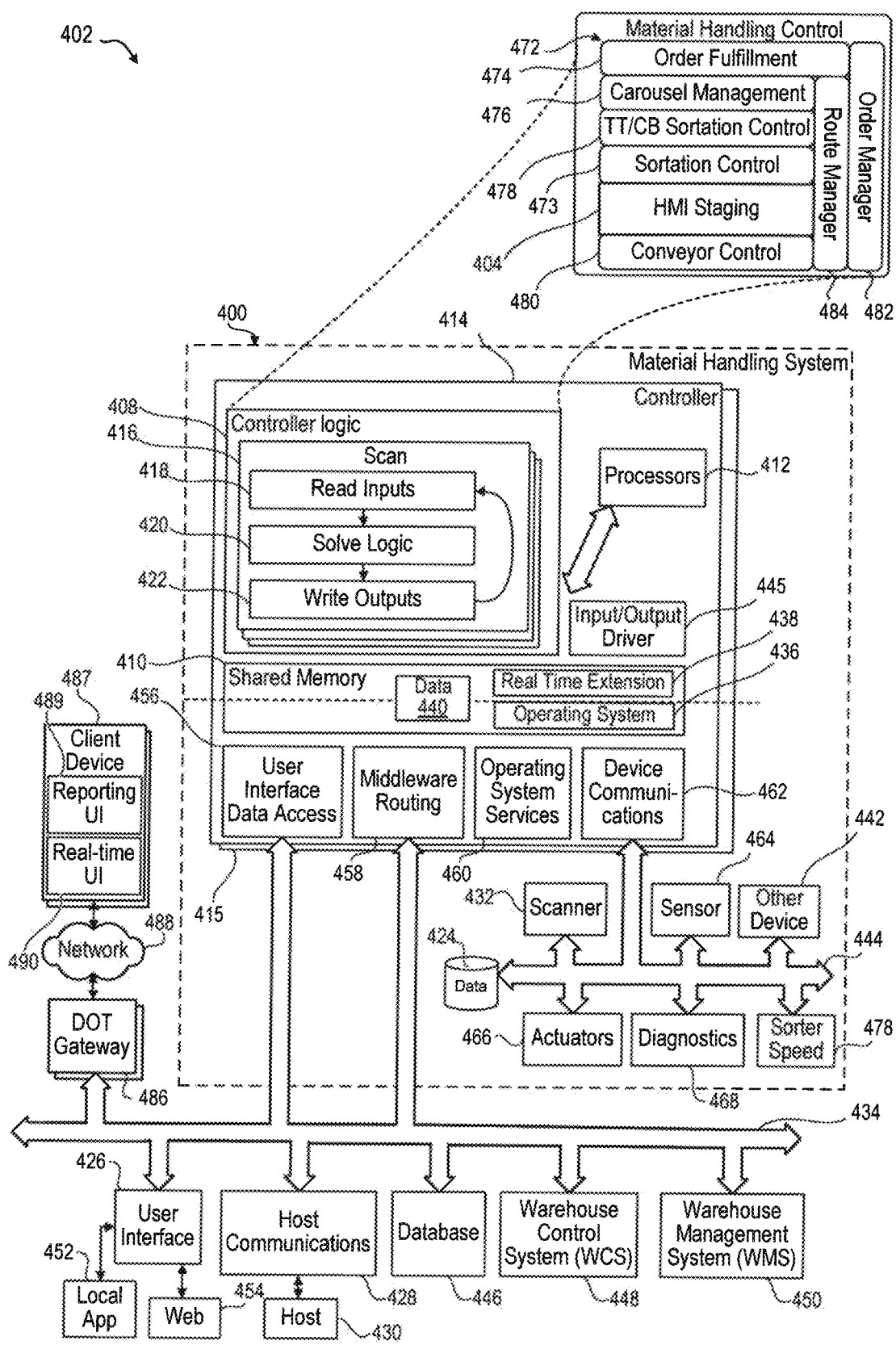
FIG. 4 illustrates a block diagram of an example real-time control system of a material handling system that is supported by a gateway server that provides multiple protocol access, according to one or more embodiments.

In FIG. 4, an exemplary material handling system 400 of a distribution center processing architecture 402 is depicted wherein HMI staging object 404 is implemented. Controller logic 408 stored in computer-readable, shared memory 410 is executed by processors 412 in a controller 414 of the material handling system 400. One function of the controller logic 408 can be machine control logic. The controller 414 can be a primary controller supported by a backup controller 415 such that maintenance personal could swap cables or connections in the event of a failure without undue service downtime. Alternatively, a supervising system or the self-diagnostics could cause automatic switching between primary and backup in the event of a failure.

Scan logic, or merely a scan 416, refers to an implementation within the controller logic 408 wherein the processors 412 repeatedly execute a read input component 418, a solve logic component 420, and a write outputs component 422. By performing this sequence on a regular, deterministic periodic basis, then the machine control logic can count scans to measure time. These three steps can be performed by a programmable logic controller (PLC), a personal computer (PC), a minicontroller, or microcontroller, etc. The solve logic component 420 can incorporate IF-THEN-ELSE branching logic, motion control, simple to sophisticates, hardlined to configured. Data, used by the solve logic component 420, can reside in the computer-readable, shared memory 410 or a data store device 424 (e.g., local, remote, cloud-based, etc.). A user interface 426 can be used to modify the solve logic component 420 such as by changing values that change the configuration or operation.

As is conventionally understood, the controller logic 408 can receive binary type inputs (e.g., switches, photo eyes, etc.) and generate binary type outputs (e.g., motor contacts, solenoid valves, lamp actuations, etc.). For example, in such an implementation, the user interface 426 can entail at least in part push button controls and lamps. More recent developments for controller logic 408 can include RS232 serial devices with cathode ray tube (CRT) screens, Liquid Crystal Display (LCD) flat panel displays, etc. and keyboards that enable dialog screens and data display along with printers for generating reports. Barcode scanning can detect items processed by the material handling system 400. More recently, wired and wireless communication within the material handling system 400 and distribution center processing architecture 402 enable more distributed and remotely isolated implementations. For example, such communication architectures may employ bus couplers such a PROFIBUS and ETHERCAT.

The scan 416 can be one of many control scans to support increased speeds and complexities for portions of the material handling system 400. Certain logic is required to be performed during shorter intervals than others and so the scans 416 can have different periodicities, often selected for convenience to occur as multiples of the shortest duration scan 416. Examples include scans 416 of 1 ms and 2 ms for motion control, 4 ms for a merge subsystem, and 211 ms for general conveyor.

The material handling system 400 can incorporate host communications 428 to a host system 430 using serial ports, Ethernet, file transfer protocol (FTP), Transfer Control Protocol/Internet Protocol (TCP/IP), etc. Thereby, the host system 430 can make decisions for the material handling system 400. For example, a scanner 432 can see a barcode. The barcode is sent to the host system 430, such as via a bridge 434. The host system 430 responds with a destination. In response, the material handling system 400 causes the item with the barcode to go to that destination. Alternatively, the process can entail receiving a batch or download of destinations mapped to barcodes as part of a lookup table (LUT) for reference by the material handling system 400.

The computer-readable shared memory 410 can allow execution of an operating system (e.g., Windows, Linux, etc.) 436 to execute with a real time extension 438. The real time extension 438 assures that the machine control logic (controller logic 408) gets to execute completely on the time schedule required. Variations in the execution schedule are measured in microseconds. This approach assures the kind of precision required for the machine control while retaining access to the power and flexibility of a general purpose Operating system (e.g., Windows). PLCs, which can also be included for machine control, can operate in their own proprietary environments (hardware and software) and are integrated using communications. Data 440 from these communications is stored in computer-readable shared memory 410 for use in control decisions and for display on user interface 426. In an exemplary version, the data 440 is not controlled by the real time extension 438. In a similar fashion, other communicating devices 442 used in the control process (e.g., scales, printers) are connected via a private internal communications bus (e.g., Ethernet) 444 to the processors 412. The controller 414 can also have internal input/output drivers 445 to interface using specific communication protocols.

The distribution center processing architecture 402 can include other systems external to the material handling system 400 that communicate via the bridge 434, such as a database 446, a warehouse control system (WCS) 448, and a warehouse management system (WMS) 450. In addition, the user interface 426 can facilitate remote or automated interaction via the user interface 426, depicted as a local application 452 and a web application 454. The controller 414 can include specific interfaces to support this interaction, such as a user interface data access component 456 to interact with user interface 426, middleware routing component 458 to interface with other external systems. Operating system services 460 and a device communication component 462 can also support the communications, such as sensors 464, actuators 466, diagnostic systems 468, and a sorter speed control 470.

The controller logic 408 can be functional described as material handling control layers 472 of software functionality, such as the sortation control 473, that address certain subsystems within a distribution center: order fulfillment 474, carousel management 476, tilt tray/cross belt (TT/CB) control 478, conveyor control 480, order manager 482 and route manager 484.

One or more DOT gateways 486 access HMI staging object 404 via bridge 434 and provide a broker service with complete cached shadow copies of real-time data from material handling control 472 to client devices 487 via one or more networks 488. A client device 487 can provide a reporting UI 489 of the real-time data utilizing a RESTful web interface. Alternatively or in addition, a client device 487 can provide a real-time UI 490 utilizing an object-oriented interface.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

For example, running average carton length can be used. Then, after a reset, the expected average for the ten minute timer can be used. The same approach can be used for the one (1) minute average for recirculation. Alternatively or in addition, inter-slug gap can be considered in the calculation.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

Figure 5:
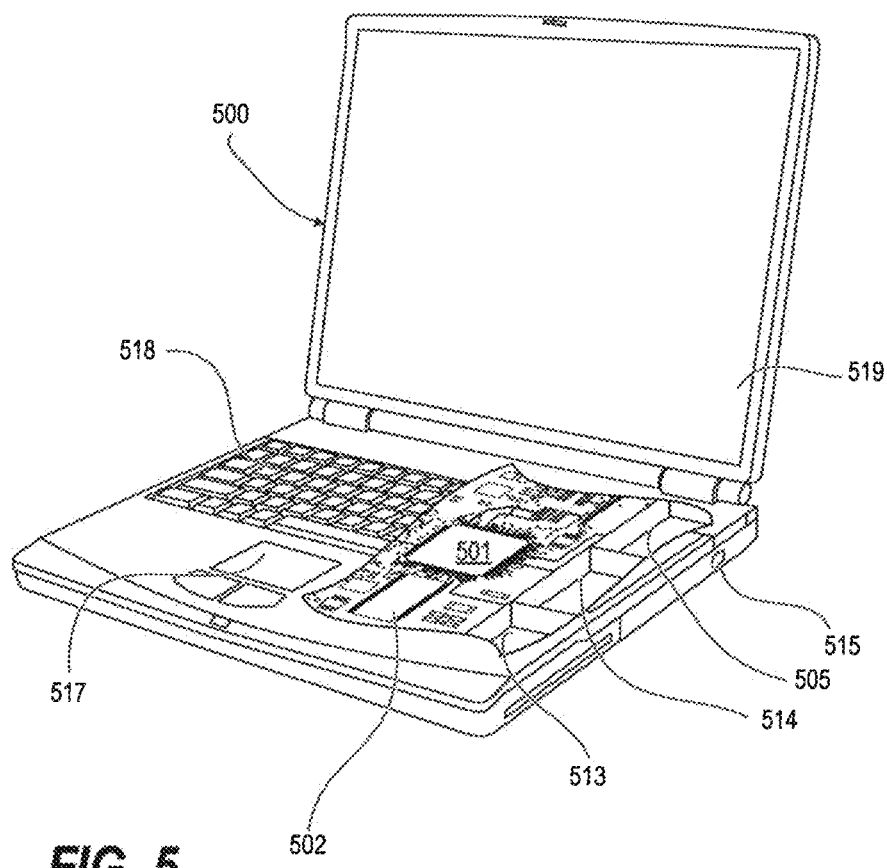
FIG. 5 illustrates an example computing device that can perform exemplary functions for the UI of FIG. 1, according to one or more embodiments.

The various embodiments may be implemented in any of a variety of computing devices, an example of which is illustrated in FIG. 5. A computing device 500 will typically include a processor 501 coupled to volatile memory 502 and a large capacity nonvolatile memory, such as a disk drive 505 of Flash memory. The computing device 500 may also include a floppy disc drive 513 and a compact disc (CD) drive 514 coupled to the processor 501. The computing device 500 may also include a number of connector ports 515 coupled to the processor 501 for establishing data connections or receiving external memory devices, such as a USB or FireWire™ connector sockets, or other network connection circuits for establishing network interface connections from the processor 501 to a network or bus, such as a local area network coupled to other computers and servers, the Internet, the public switched telephone network, and/or a cellular data network. The computing device 500 may also include the trackball or touch pad 517, keyboard 518, and display 519 all coupled to the processor 501.

Figure 6:
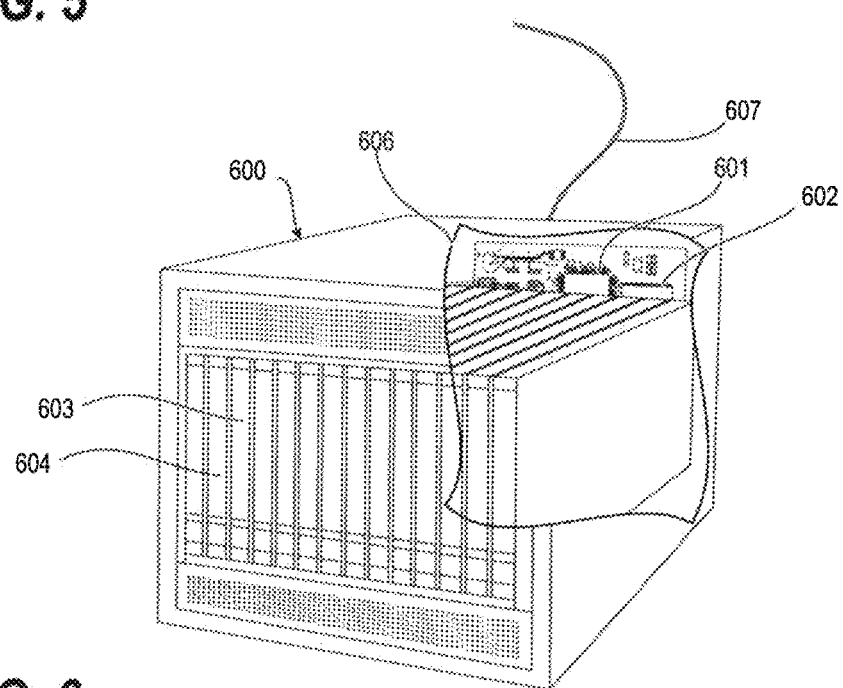
FIG. 6 illustrates an example server device that can perform exemplary functions for the UI of FIG. 1, according to one or more embodiments.

The various embodiments may also be implemented on any of a variety of commercially available server devices, such as the server 600 illustrated in FIG. 6. Such a server 600 typically includes a processor 601 coupled to volatile memory 602 and a large capacity nonvolatile memory, such as a disk drive 603. The server 600 may also include a floppy disc drive, compact disc (CD) or DVD disc drive 604 coupled to the processor 601. The server 600 may also include network access ports 606 coupled to the processor 601 for establishing network interface connections with a network 607, such as a local area network coupled to other computers and servers, the Internet, the public switched telephone network, and/or a cellular data network.

Figure 7:
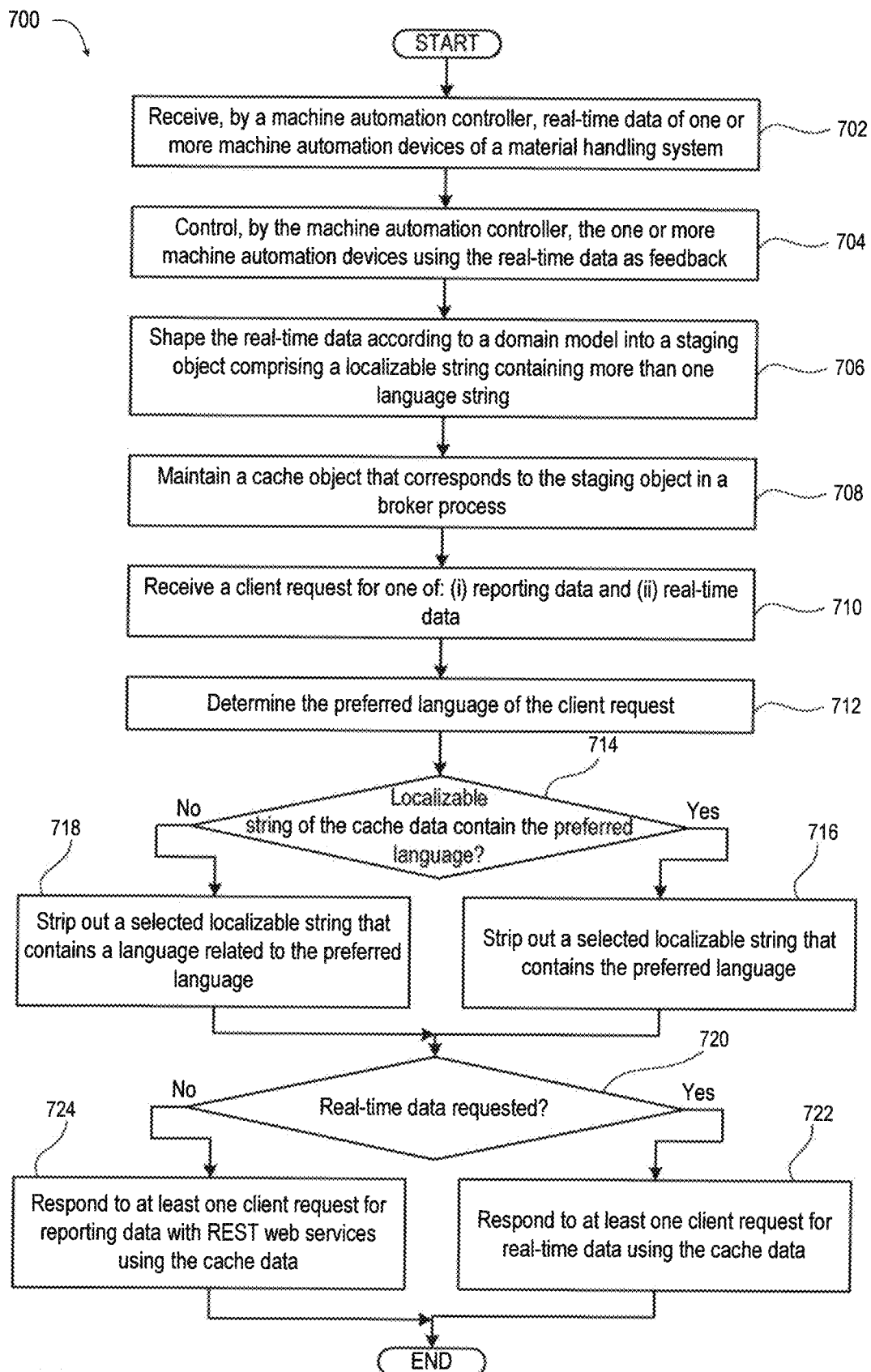
FIG. 7 illustrates a flow diagram of a method of, according to one or more embodiments.

FIG. 7 illustrates a method 700 of providing data reporting and real-time data to user interfaces of client devices of a material handling system. In one or more embodiments, the method 700 includes receiving, by a machine automation controller, real-time data of one or more machine automation devices of a material handling system (block 702). Method 700 includes controlling, by the machine automation controller, the one or more machine automation devices using the real-time data as feedback (block 704). Method 700 shaping the real-time data according to a domain model into a staging object comprising a localizable string containing more than one language string (block 706). Method 700 includes maintaining a cache object that corresponds to the staging object in a broker process (block 708). Method 700 includes receiving a client request for one of: (i) reporting data and (ii) real-time data (block 710). Method 700 includes determining the preferred language of the client request (block 712). Method 700 includes determining whether the localizable string of the cache data contains the preferred language (decision block 714). In response to determining that the localizable string contains the preferred language in decision block 714, method 700 includes stripping out a selected localizable string that contains the preferred language (block 716). In response to determining that the localizable string does not contain the preferred language in decision block 714, method 700 includes stripping out a selected localizable string that contains a language related to the preferred language (block 718). After either block 716 or 718, method 700 includes responding to one or more client requests for a data item by transmitting at least a portion of data contained in the cache object to a client device for presenting in a user interface. In particular, method 700 includes determining whether real-time data is requested (decision block 720). In response to determining that real-time data is requested in decision block 720, method 700 includes responding to at least one client request for real-time data using the cache data (block 722). Then method 700 ends. In response to determining that real-time data is requested in decision block 720, method 700 includes responding to at least one client request for reporting data with REST web services using the cache data (block 724). Then method 700 ends.

While the present embodiment of the invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A method of providing data reporting and real-time data to user interfaces of client devices of a material handling system, the method comprising:
   receiving, by a machine automation controller, real-time data of one or more machine automation devices of subsystems in the material handling system;
   controlling, by the machine automation controller, the one or more machine automation devices using the real-time data as feedback;
   shaping the real-time data according to a domain model into a staging object, wherein the domain model is created for each subsystem of the material handling system;
   maintaining a cache object that corresponds to the staging object in a broker process; and
   responding to one or more client requests for a data item by transmitting at least a portion of data contained in the cache object to a client device for presentation in a standardized user interface generated by a unified architecture based on the domain model, wherein the standardized user interface is common for all the subsystems of the material handling system and facilitates a consistent presentation of the subsystems at the client device, and further wherein the standardized user interface comprises a reporting user interface and a real-time user interface, the reporting user interface facilitating presentation of alarm data, event data, and statistical history data associated with the subsystems of the material handling system in a browser-style interface, the alarm data, the event data, and the statistical history data relayed via representational state transfer (REST) protocol, and the real-time user interface facilitating presentation of real-time data of the subsystems of the material handling system in an object-oriented interface, the real-time data relayed via web sockets protocol.

2. The method of claim 1, further comprising responding to at least one client request for real-time data.

3. The method of claim 1, further comprising responding to at least one client request for representational state transfer (REST) web services for reporting data.

4. The method of claim 1, wherein:
   the staging object comprises a localizable string containing more than one language; and
   responding to the one or more client requests for the data item further comprises:
      determining a preferred language of the one or more client requests; and
      stripping out a selected localizable string that contains the preferred language.

5. The method of claim 1, wherein:
   the staging object comprises a localizable string containing more than one language; and
   responding to the one or more client requests for the data item further comprises:
      determining a preferred language of the one or more client requests;
      determining whether the localizable string contains the preferred language;
      in response to determining that the localizable string contains the preferred language, stripping out a first selected localizable string that contains the preferred language; and
      in response to determining that the localizable string does not contain the preferred language, stripping out a second selected localizable string that contains a related language to the preferred language that is contained in the localizable string.

6. The method of claim 1, wherein the domain model is a set of XML documents that are generated into an API code, and wherein the API code includes data marshalling.

7. The method of claim 1, wherein shaping the real-time data further comprises converting the real-time data into a standard form that is described by the domain model.

8. The method of claim 1, wherein maintaining the cache object that corresponds to the staging object in the broker process comprises:
   one or more distributed object technology gateways providing the broker process by accessing the staging object to maintain the cache object, the cache object comprising a cached, shadow copy of the real-time data.

9. A material handling system comprising:
   one or more machine automation devices;
   one or more client devices, each of the one or more client devices characterized by a standardized user interface generated by a unified architecture based on a domain model, the standardized user interface comprising a reporting user interface and a real-time user interface, the reporting user interface facilitating presentation of alarm data, event data, and statistical history data associated with subsystems of the material handling system in a browser-style web interface, the alarm data, the event data, and the statistical history data relayed via representational state transfer (REST) protocol, and the real-time user interface facilitating presentation of real-time data of the subsystems of the material handling system in an object-oriented interface, the real-time data relayed via web sockets protocol;
   a network in communication with each of the one or more machine automation devices and each of the one or more client devices;
   a machine automation controller in communication with the one or more machine automation devices over the network to:
      (i) receive the real-time data of the one or more machine automation devices of the subsystems in the material handling system,
      (ii) control the one or more machine automation devices using the real-time data as feedback, and
      (iii) shape the real-time data according to the domain model into a staging object, wherein the domain model is created for each subsystem of the material handling system; and
   a gateway system in communication over the network with the machine automation controller and each of the one or more client devices, the gateway system comprising a processor subsystem that executes a broker process to:
      (i) maintain a cache object that corresponds to the staging object, and (ii) respond to one or more client requests for a data item from at least one of the one or more client devices by transmitting at least a portion of data contained in the cache object to the at least one of the one or more client devices;

wherein the at least one of the one or more client devices presents the at least the portion of data contained in the cache object in the standardized user interface, wherein the standardized user interface is common for all the subsystems of the material handling system and facilitates a consistent presentation of the subsystems at the at least one of the one or more client devices.

10. The material handling system of claim 9, wherein the gateway system responds to at least one client request for real-time data and utilizes a binary protocol.

11. The material handling system of claim 9, wherein the gateway system responds to at least one client request for representational state transfer (REST) web services for reporting data.

12. The material handling system of claim 9, wherein:
the staging object comprises a localizable string containing more than one language; and
the gateway system responds to the one or more client requests for the data item by:
determining a preferred language of the one or more client requests; and
stripping out a selected localizable string that contains the preferred language.

13. The material handling system of claim 9, wherein:
the staging object comprises a localizable string containing more than one language; and
the gateway system responds to the one or more client requests for the data item by:
determining a preferred language of the one or more client requests;
determining whether the localizable string contains the preferred language;
in response to determining that the localizable string contains the preferred language, stripping out a first selected localizable string that contains the preferred language; and
in response to determining that the localizable string does not contain the preferred language, stripping out a second selected localizable string that contains a related language to the preferred language that is contained in the localizable string.

14. The material handling system of claim 9, wherein the subsystems are linear sorters or loop sorters, transport conveyors, palletizers, and order fulfillment stations.

15. The material handling system of claim 9, wherein the data item corresponds to the staging object in the machine automation controller, and wherein multiple client processes simultaneously include data items that correspond to the same staging object.

16. The material handling system of claim 9, wherein the material handling system further comprises:
a cloud-based monitoring system to maintain the alarm data, the event data, and the statistical history data.

17. The material handling system of claim 9, wherein the gateway system utilizes the domain model to obtain a complete cached shadow copy of the real-time data of the one or more machine automation devices.

18. The material handling system of claim 9, wherein the domain model is configured to identify data that needs to update in real time.

19. The material handling system of claim 9, wherein the consistent presentation of the subsystems at the at least one of the one or more client devices is based on the domain model, and wherein the one or more client requests comprise one or more client requests for reporting data or real-time data.

20. A material handling system comprising:
one or more machine automation devices;
one or more client devices;
a network in communication with each of the one or more machine automation devices and each of the one or more client devices;
a machine automation controller in communication with the one or more machine automation devices over the network to:
(i) receive real-time data of the one or more machine automation devices of subsystems in the material handling system,
(ii) control the one or more machine automation devices using the real-time data as feedback, and
(iii) shape the real-time data according to a domain model into a staging object, wherein the domain model is created for each subsystem of the material handling system;
a gateway system in communication over the network with the machine automation controller and each of the one or more client devices, the gateway system comprising a processor subsystem that executes a broker process to:
(i) maintain a cache object that corresponds to the staging object, and
(ii) respond to one or more client requests for a data item from at least one of the one or more client devices by transmitting at least a portion of data contained in the cache object to the at least one of the one or more client devices,
wherein the at least one of the one or more client devices presents the at least the portion of data of contained in the cache object in a standardized user interface generated by a unified architecture based on the domain model, wherein the standardized user interface is common for all the subsystems of the material handling system and facilitates a consistent presentation of the subsystems at the at least one of the one or more client devices, and wherein the standardized user interface comprises a reporting user interface and a real-time user interface; and
a cloud-based monitoring system to maintain alarms, events and statistical history of the subsystems of the material handling system that is received and relayed using representational state transfer (REST) protocol to the reporting user interface of the at least one of the one or more client devices as the standardized user interface with consistent presentation across the subsystems; and
wherein a web sockets protocol delivers real-time data to the real-time user interface of the at least one of the one or more client devices as the standardized user interface with consistent presentation across the subsystems.

* * * * *